United States Patent [19]

Deitchman et al.

[11] Patent Number: 4,838,617

[45] Date of Patent: Jun. 13, 1989

[54] METHOD AND APPARATUS FOR BRAKE APPLICATION

[75] Inventors: Walter H. Deitchman, Shawnee Mission; Gaylord R. Pearson, Kansas City, both of Kans.

[73] Assignee: Pearson and Deitchman Research and Dev. Co., Inc., Shawnee Mission, Kans.

[21] Appl. No.: 161,253

[22] Filed: Feb. 22, 1988

Related U.S. Application Data

[63] Continuation-in-part of Ser. No. 11,116, Feb. 5, 1987, abandoned.

[51] Int. Cl.[4] ................. B60T 13/00; B60K 28/16; G05G 1/14
[52] U.S. Cl. ..................... 303/6.1; 303/9.61; 180/271; 180/286; 74/512
[58] Field of Search ............. 303/1, 6.1, 9.61, 20, 303/93, 100; 180/271, 281, 286; 188/2 R; 192/129 A, 129 B; 105/341; 74/512

[56] References Cited

U.S. PATENT DOCUMENTS

| | | | |
|---|---|---|---|
| 1,431,461 | 10/1922 | Ives | 303/6.1 |
| 1,431,477 | 10/1922 | Macloskie et al. | 303/6.1 |
| 1,515,842 | 11/1924 | Dapron | 303/6.1 |
| 2,588,815 | 3/1952 | Fasolino | 180/271 |
| 2,724,451 | 11/1955 | Prather | 180/82.1 |
| 2,782,028 | 2/1957 | Almond | 268/20 |
| 2,823,755 | 2/1958 | Hall | 180/82 |
| 3,371,486 | 3/1968 | Hager | 74/512 |
| 3,549,207 | 12/1970 | Hayes | 303/6.1 |
| 3,893,697 | 7/1975 | Blitz et al. | 303/6.1 |
| 4,291,653 | 9/1981 | Tucker | 180/286 X |
| 4,446,695 | 5/1984 | Wise et al. | 192/3 TR |
| 4,524,312 | 6/1985 | Matsumoto et al. | 303/20 X |
| 4,629,043 | 12/1986 | Matsuo et al. | 192/3 TR |
| 4,699,435 | 10/1987 | Wupper | 303/6.1 X |

Primary Examiner—Andres Kashnikow
Assistant Examiner—Timothy Newholm
Attorney, Agent, or Firm—Kokjer, Kircher, Bradley, Wharton, Bowman & Johnson

[57] ABSTRACT

A valve is coupled with a brake line of a vehicle for causing or maintaining vehicle brake application. A switch coupled with a vehicle door regulates operation of the valve. When the vehicle door is open, the switch signals the valve to cause or maintain brake application. A timer coupled with the valve maintains the valve in an applied condition for a predetermined period of time after the door has been closed to allow disembarking passengers adequate time to move away from the vehicle. A sensor may be coupled with the vehicle for determining vehicle speed and preventing operation of the valve when the vehicle is traveling above a predetermined speed.

15 Claims, 3 Drawing Sheets

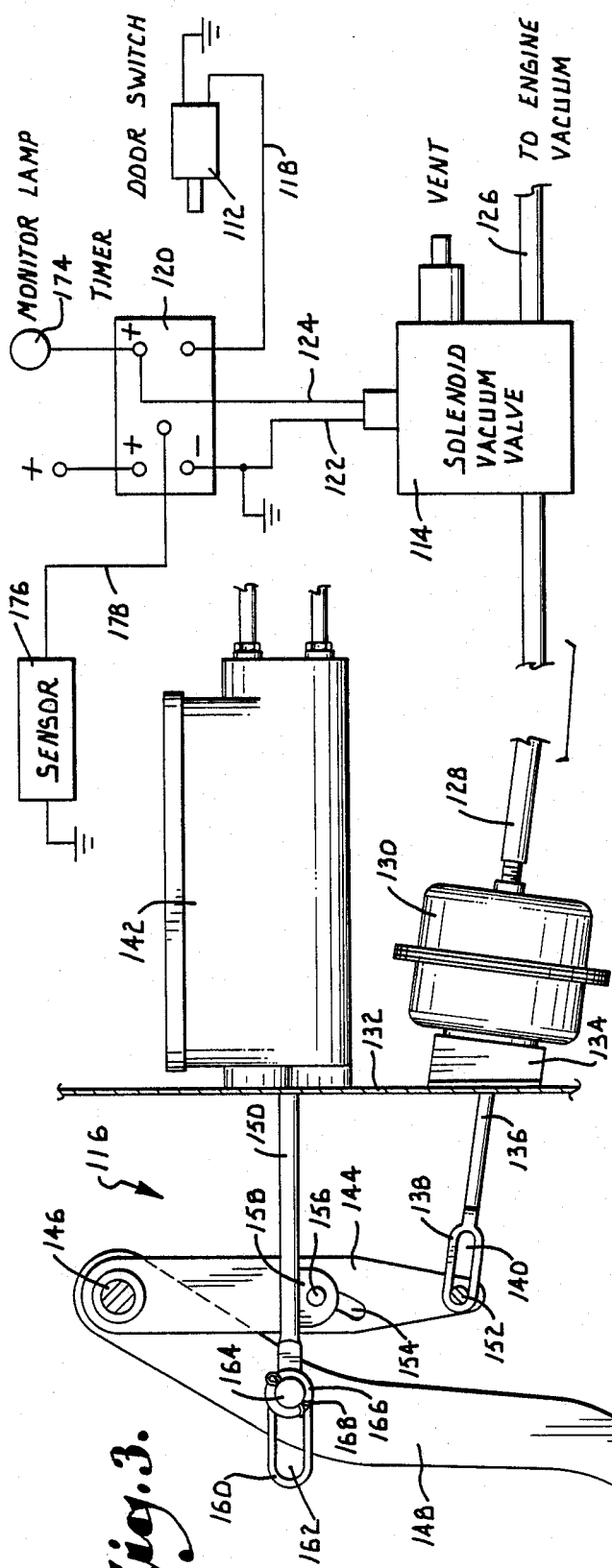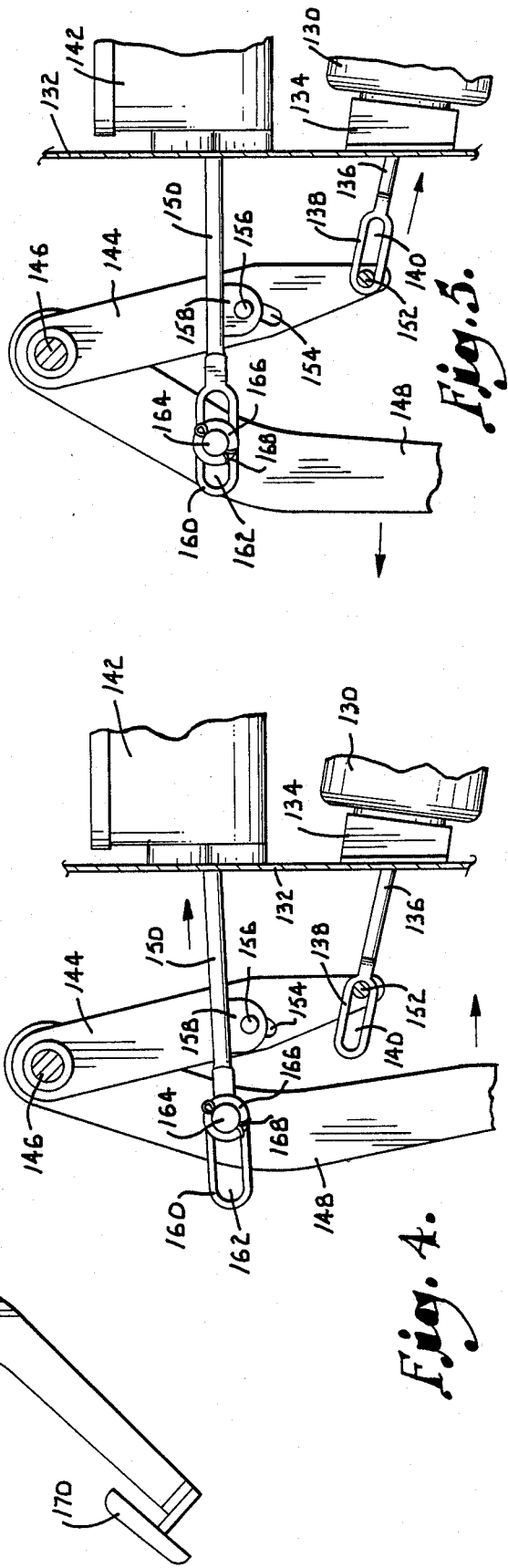

METHOD AND APPARATUS FOR BRAKE APPLICATION

This is a continuation-in-part of co-pending application Ser. No. 011,116, filed on Feb. 5, 1987.

BACKGROUND OF THE INVENTION

This invention relates in general to braking systems and, more particularly, to a system operable to apply or maintain the application of a vehicle's brakes while a vehicle door is open and to continue to maintain the brakes in an applied condition for a predetermined period of time after the door has been closed.

Numerous injuries and deaths are caused each year by vehicles striking individuals who are waiting to board or who have disembarked from the vehicle. This problem is particularly acute with school buses transporting school children. While the children are often instructed on the proper procedures for getting on and off the school bus, they frequently disobey such instructions and move into the path of the bus. At other times, the children stumble as they disembark and are struck by the rear wheels of the bus if the driver pulls away from the stop without checking to make sure the child has moved a safe distance from the bus. Injuries have also been known to occur when the child's clothing or book bag becomes caught in the vehicle door and the bus pulls away before the driver notices the entangled child. In addition, when a bus is stopped on an incline, a driver preoccupied with opening and closing the door may fail to maintain firm pressure on the brake pedal and the resulting movement of the bus may also result in injury to those in the vicinity of the bus.

A prior attempt to limit such injuries has focused on a system which automatically applies the vehicle brakes when the vehicle has slowed to a predetermined speed. This system has an obvious disadvantage in that the vehicle is forced to stop regardless of whether the vehicle has slowed because of the flow of traffic or is stopping to let off passengers. Other systems have interlocked the brakes and the vehicle doors so that the brakes are applied and cannot be released when the doors are open. While these systems may prevent inadvertent movement of the vehicle when the doors are open, they do not prevent injuries which result after the door has closed and the driver pulls away before a disembarking passenger has moved a safe distance from the vehicle.

SUMMARY OF THE INVENTION

It is an object of this invention to provide a system which will automatically maintain application of the brakes of a vehicle when a vehicle door is opened and for a predetermined period of time after the door is closed to prevent movement of the vehicle and injury which might result to individuals who are waiting to board the vehicle or who have disembarked from the vehicle.

As a corollary to the previous objective, it is another object of the invention to provide a system as described which, while the door remains open, will maintain the brakes in an applied condition to prevent vehicle movement should the brake pedal be released.

A further object of this invention is to provide a system which will prevent release of a vehicle's brakes when a vehicle door is opened, but which will allow additional braking pressure to be applied if needed to prevent vehicle movement.

It is a still further object of this invention to provide a system which will automatically cause application of the vehicle brakes when the vehicle door is open so that the vehicle will stop even if the driver should fail to depress the brake pedal.

It is also an object of this invention to provide a brake safety system as described which prevents the driver from releasing the brakes while the door is open and for a predetermined period after it is closed so that the driver may not circumvent the safety features of the invention.

To accomplish these and other related objects of the invention, a valve coupled with the brake line of the vehicle is provided and is moveable between a first position preventing release of the vehicle brakes and a second position allowing release of the brakes. The valve is moved to the first position when the vehicle door is opened and is moved to the second position after the door is closed. A timer coupled with the valve delays movement of the valve to the second position for a predetermined period of time after the door has closed.

In another embodiment of the invention, a vacuum valve or other means is coupled with the vehicle brake system through a linkage which causes engagement of the brakes when the valve is activated upon opening of the vehicle door. The linkage allows movement of the brake pedal independently of the vacuum valve to prevent release of the brakes when the valve is activated. A sensor coupled with the vehicle prevents activation of the valve while the vehicle is traveling above a predetermined speed.

BRIEF DESCRIPTION OF THE DRAWING

FIG. 3 is an elevational view of the second embodiment of the invention with portions shown schematically for purposes of illustration.

FIG. 4 is a fragmentary elevational view of a portion of the apparatus shown in FIG. 3 with arrows indicating the direction of movement of various components.

FIG. 5 is a fragmentary elevational view similar to that shown in FIG. 4 with arrows indicating the direction of movement of various components.

DESCRIPTION OF THE PREFERRED EMBODIMENTS

Figure 1:
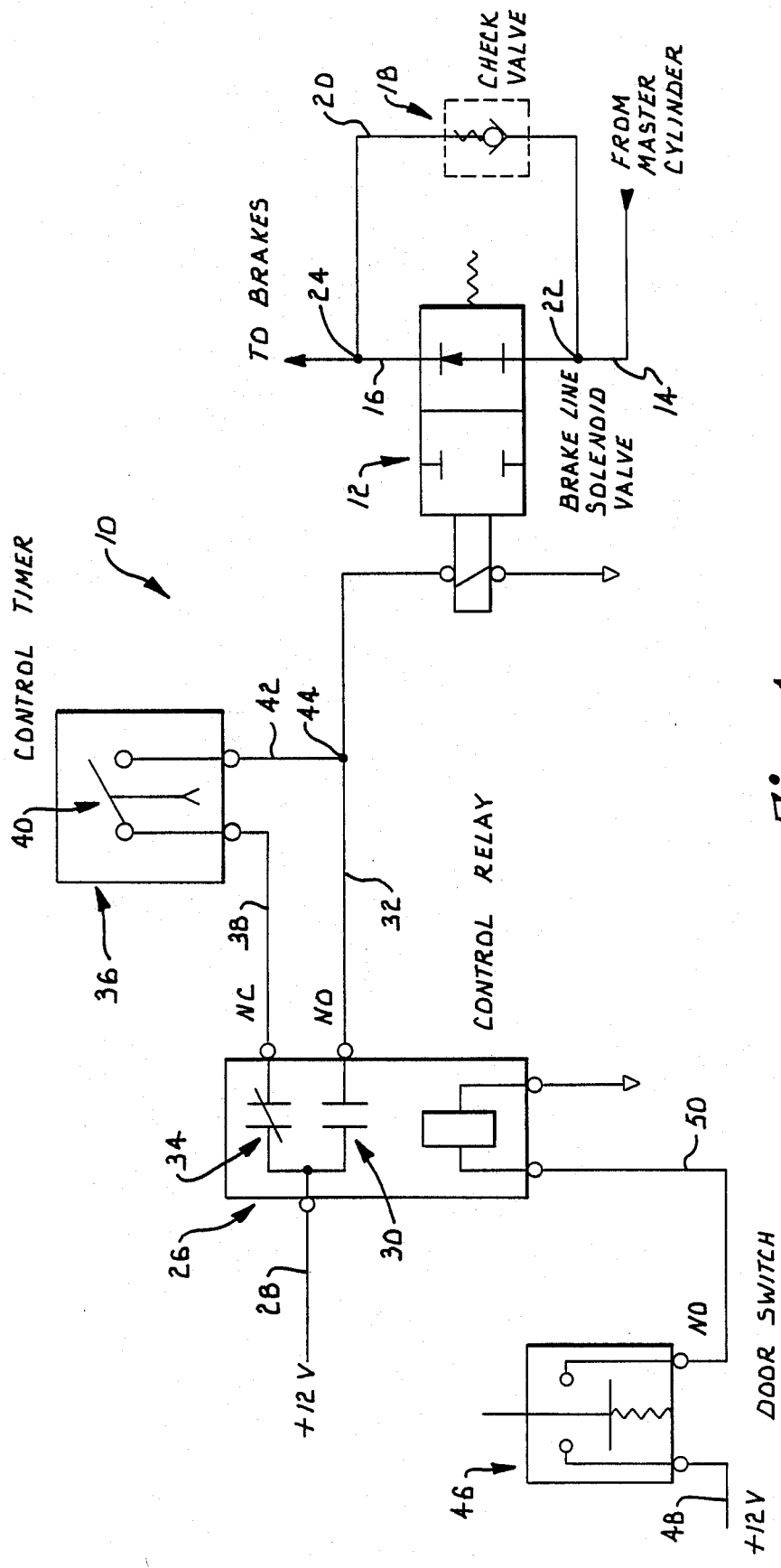
FIG. 1 is a diagram of the apparatus of one embodiment of the present invention utilizing graphic symbols to illustrate the various components.

Referring now to the drawings, one embodiment of the apparatus of the present invention is represented generally by the numeral 10. The apparatus 10 includes a normally open, two-way brake line solenoid valve 12 which is of the type known to those of skill in the art and comprises an electrically energized coil of insulated wire, a plunger, and a pair of ports. A brake line 14 emanating from a master cylinder (not shown) is coupled with one of the ports and another brake line 16 leading to the vehicle brakes (not shown) is coupled with the other port. The apparatus 10 has utility with braking systems employing various types of fluid including air brakes. A one-way check valve 18 is positioned in a bypass brake line 20 which is coupled with brake line 14 at junction 22 and brake line 16 at junction 24. The check valve 18 may be of any of the various types of fluid control devices which allow only a one directional flow of the fluid, such as swing, ball or vertical check valves.

An electrical relay 26 for controlling the brake line solenoid valve 12 is in electrical communication with the coil of the solenoid valve 12. A 12-volt power source such as the vehicle battery is coupled with the control relay 26 by conductor 28. A pair of normally open contacts 30 in the control relay 26 are coupled with conductor 28 and a conductor 32 which connects the relay with the coil of the solenoid valve 12. A pair of normally closed contacts 34 in the control relay 26 are coupled with a control timer 36 by conductor 38. A switch 40 in the control timer 36 connects conduct 38 with a conductor 42 which joins with conductor 32 at junction 44.

A normally open door switch 46 is mounted for contact with a vehicle door (not shown) and is maintained in an open position when the vehicle door is closed and then moves to a closed position when the vehicle door is open. The switch 46 is connected by conductor 48 to a 12-volt power source and is connected with control relay 26 by conductor 50.

In operation, when the driver of a vehicle applies the brakes by depressing the brake pedal in preparation for stopping to pick up or unload passengers, the pressure of the brake fluid in brake lines 14 and 16 increases through conventional operation of the master cylinder. The solenoid valve 12 is in a normally open position and the brake fluid is allowed to flow through the valve to cause application of the brakes to bring the vehicle to a complete stop. When the vehicle door is then opened, the door switch 46, which is in a normally open position, is closed and current flows from the 12-volt power source through conductor 48, switch 46, and conductor 50 to the control relay 26, thus closing the normally open contacts 30 and opening the normally closed contacts 34. Current then flows from the 12-volt power source through conductors 28 and 32 to the coil of the solenoid valve 12. The energized coil creates a magnetic field and shifts the plunger to a first position to block the flow of brake fluid through the valve 12. The valve contains the pressure in brake line 24 and prevents the release of the brakes even if pressure on the brake pedal is released.

When the door of the vehicle is then closed, the door switch 46 is opened, breaking the circuit leading to the control relay through conductor 50. The normally open contacts 30 are then opened and the normally closed contacts 34 are closed. Current then flows from the 12-volt power source through conductors 28 and 38 to the control timer 36 and closes the switch 40 for a predetermined period of time. Current flows across the switch 40 and through conductor 42 to maintain current flow through a portion of conductor 32 to the coil of the solenoid valve 12. The plunger is thus maintained in the first position blocking the flow of fluid through the solenoid valve 12. After the predetermined period of time has expired, the timer 36 opens the switch 40 and blocks the flow of current through conductors 42 and 32 to the solenoid valve 12. The coil is then deenergized and the plunger moves to a second or original position which allows the flow of fluid through the solenoid valve 12 and the release of the brakes.

The check valve 18 and bypass brake line 20 permits the driver of the vehicle to supply additional braking pressure when the plunger of the solenoid valve 12 blocks the flow of brake fluid through the valve 12. Depression of the brake pedal while the plunger is in the first position forces brake fluid through bypass line 20 and check valve 18 to increase the braking pressure. When the brake pedal is released, reverse flow of the brake fluid through line 20 is blocked by the check valve 18.

Thus, the apparatus 10 of the present invention maintains the applied braking pressure while a vehicle floor is open. When the vehicle door is closed, the braking pressure is maintained for a predetermined period of time to prevent movement of the vehicle until a sufficient time has elapsed to permit disembarking passengers to move a safe distance from the vehicle. This period of time may be adjusted but is preferably approximately five seconds. The apparatus 10 also prevents injury to passengers by preventing movement of the vehicle should the driver release pressure on the brake pedal while parked on an incline. The bypass check valve 18 allows additional braking pressure to be applied should additional braking pressure be needed.

Figure 2:
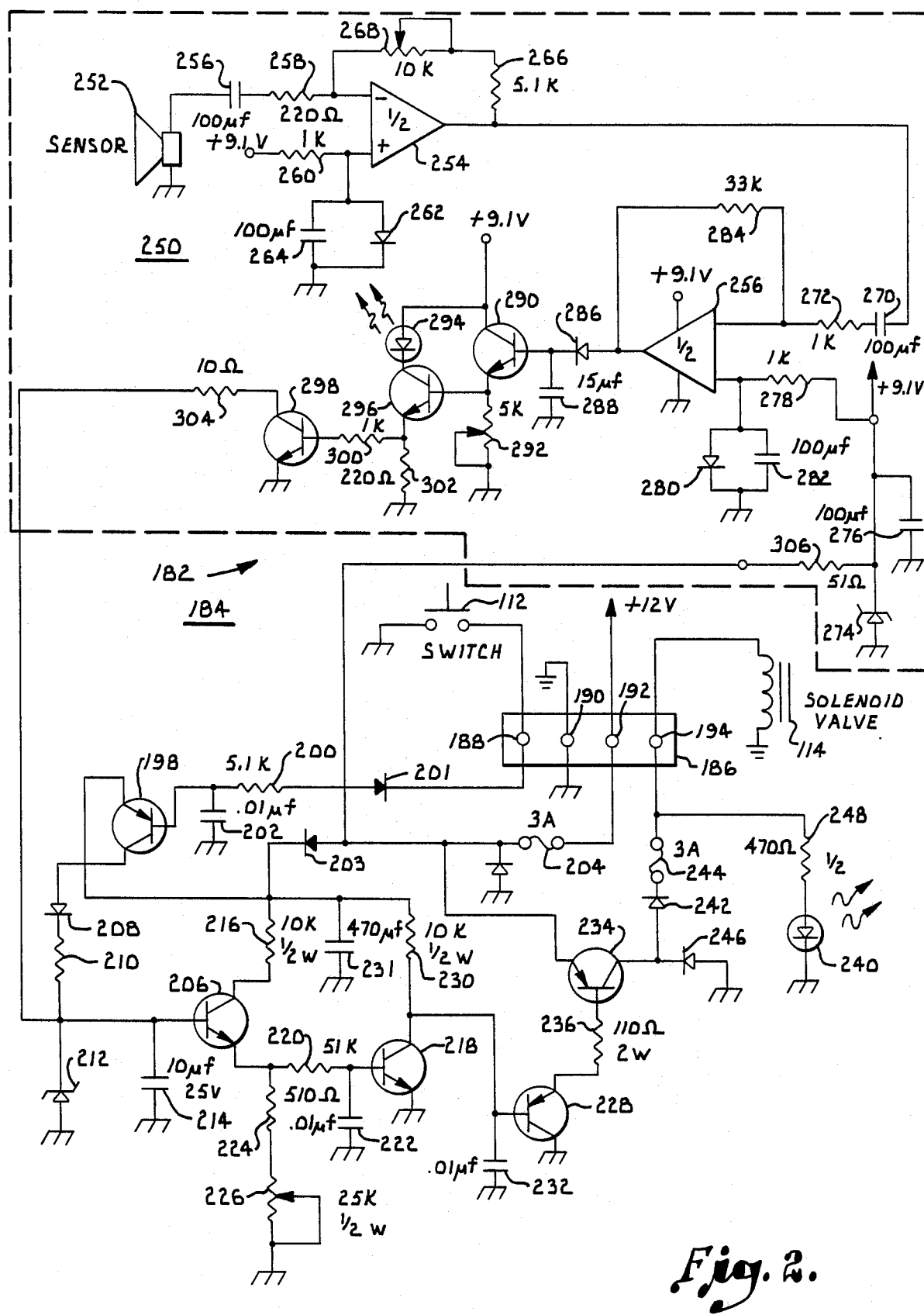
FIG. 2 is a diagram of a control circuit of a second embodiment of the present invention.

Turning now to FIGS. 2-4, an alternate embodiment of the invention will be described. Apparatus 110 may be operated to cause and maintain vehicle brake application under preselected conditions. The apparatus generally comprises a door switch 112 which is mounted on the vehicle for determining when a vehicle door is moved between open and closed positions, a solenoid vacuum valve 114 which is coupled with the door switch, and a mechanical linkage 116 which operably couples the vacuum valve with the vehicle braking system.

Door switch 112 may comprise various types of sensing elements for determining the position of the vehicle door. Depending upon the type of sensing element utilized, switch 112 may be variously positioned in relation to the door. Preferably, a mechanical switch is coupled with the door frame for indicating whether the door is in an open or closed position. Other types of switches may also be used for this purpose.

Switch 112 is coupled with solenoid valve 114 by a suitable conductor 118 which leads to a control box 120 and conductors 122 and 124 which lead from the control box to the solenoid valve. Valve 114 may comprise various types of known solenoid vacuum valves and is coupled by a vacuum line 126 to a vacuum source such as provided by the vehicle engine. The valve is coupled by another vacuum line 128 to a vacuum pod 130 which is mounted on firewall 132 in the engine compartment by bracket 134. Pod 130 comprises an external housing enclosing internal components which are coupled with an extendable elongated member or plunger rod, 136. The internal components of vacuum pod 130 may comprise various types of vacuum operable arrangements suitable for causing axial extension and retraction of member 136.

Member 136 comprises a generally Y-shaped rod which extends through the firewall 132 and forms a part of mechanical linkage 116. The outer end portion of the rod comprises a retainer element 138 having a closed-ended slot 140. Another retainer element (not shown) extends from the rod end portion is spaced apart and side-by-side relationship to element 138 to form the Y-shape of the rod.

Linkage 116 provides a mechanical coupling of vacuum pod 130 with a vehicle master brake cylinder 142. The linkage comprises the elongated member 136, a linkage arm 144 which is coupled at one end with member 136 and at the other end with a pivot rod 146, a brake pedal linkage arm 148, and a plunger rod 150 which couples the linkage arms 144 and 148 with master cylinder 142. Linkage arm 144 includes a retaining pin 152 which extends through the lower end of the arm and is received within the closed slots 140 of the retainer elements 138. A washer placed over the pin and a cotter pin (not shown) extending through the end portion of the pin may be used to maintain the pin within each slot.

Linkage arm 144 is coupled with plunger rod 150 by an arcuate, generally longitudinally extending slot 154 positioned in the linkage arm to receive a guide pin 156 which is connected to an ear portion 158 of plunger rod 150. The slot provides a camming surface for pin 156 to guide relative movement of the linkage arm and plunger rod. Pin 156 extends through the slot and may be maintained therein by a washer and cotter pin.

Brake pedal linkage arm 148 is mounted at one end on pivot rod 146 but may pivot independently of linkage arm 144. A brake pedal 170 is coupled with the other end of linkage arm 148. A spring or other means is coupled with the linkage arm for biasing it toward the normal operating position shown in FIG. 3. The outer end portion of plunger rod 150 includes a retainer element 160 having a closed-ended slot 162 formed therein. A retaining pin 164 mounted on the brake pedal linkage arm 148 extends through slot 162 to couple the linkage arm with brake master cylinder 142. A washer 166 and cotter pin 168 are used to prevent disengagement of the pin 164 from slot 162.

Brake master cylinder 142 is mounted to firewall 132 and includes brake hydraulic lines 172 which lead to the individual wheel brake cylinders. It is to be understood, of course, that other types of braking systems such as air brakes may also be utilized with this invention.

The control box 120 contains the principal circuitry for controlling operation of the apparatus 110. One or more monitor lamps 174 may be coupled with the control box and positioned in the vehicle at a location visible to the driver. A sensor 176 which will be subsequently described in greater detail is connected to the control box by a suitable conductor 178. Another conductor 180 connects the control box with a 12 volt power supply such as a primary or auxiliary vehicle battery.

Turning to FIG. 2, the apparatus control circuitry 182 which is coupled with control box 120 will now be described. Circuitry broadly designated as 184 regulates operation of solenoid vacuum valve 114 and includes a wiring unit 186 having a series of terminals 188, 190, 192 and 194. Terminal 188 is coupled with door switch 112. Terminal 190 is wired with the common chassis line and is also grounded. Terminal 192 is connected to a 12 volt power supply and terminal 194 is coupled with solenoid vacuum valve 114.

An emitter pnp-type transistor 198 is wired to terminal 188 through a series resistor 200 and diode 201. A high frequency gain regulating capacitor 202 is also connected to the transistor base connection. The transistor emitter connection is coupled with terminal 192 and the power supply through diode 203 and fuse 204. The collector connection is wired to the base connection of npn-type transistor 206 through diode 208 and resistor 210. A Zener diode 212 and a timing capacitor 214 are also connected with the base connection of transistor 206. The collector connection of transistor 206 is connected through biasing resistor 216 with the emitter of transistor 198 and the power supply.

The emitter of transistor 206 is coupled with the base of npn-type transistor 218 through biasing resistor 220. A variable RC timing circuit is coupled with transistor 218 base and includes capacitor 222 which reduces the high frequency gain of transistor 218, fixed resistor 224, capacitor 214, and variable resistor 226. The emitter connection of transistor 218 is coupled with the common chassis ground and the collector connection is coupled with the base of pnp-type transistor 228. A biasing resistor 230 and capacitor 231 are also provided in the connection between transistor 218 and terminal 192.

A capacitor 232 is connected to the base of transistor 228 for reducing the high frequency gain. Transistor 228 collector is coupled to the chassis ground and the emitter is coupled to the base connection of power transistor 234 through resistor 236. The emitter connection of transistor 234 is linked to the power supply and the collector connection is coupled with terminal 194 and solenoid vacuum valve 114. The emitter connection is also coupled with an LED indicator 240 which corresponds to monitor lamp 174. Diode 242 and fuse 244 are placed in series between the terminal 194 and transistor 234 collector connection. A diode 246 is positioned in wiring which leads from the chassis ground and is connected to the wiring leading from the collector. A resistor 248 is placed in series with LED indicator 240.

The transistors 198, 206, 218, 228 and 234 comprise npn and pnp type transistors with transverse biased bases. Transistors 206 and 218 may be obtained under Motorola part number 2N3904. Transistor 228 may be obtained under Motorola part number 2N2907A and transistor 234 is available under Motorola part number MJ2955A or ECG281.

That portion of the circuitry designated by the numeral 250 comprises a sealed dynamic sensor 252 which is coupled with a pair of two input operational amplifiers 254 and 256. Sensor 252 comprises a low impedance air sealed dynamic microphone and corresponds to sensor 176 previously identified.

Sensor 252 is coupled with amplifier 254 through a series capacitor 256 and resistor 258. Amplifier 254 is biased with a 9.1 volt power supply through resistor 260. A biasing circuit, comprising a diode 262 and capacitor 264 connected in parallel, is connected to an input of the amplifier. A feedback loop comprising a fixed resistor 266 and a variable resistor 268 allow variable sensor gain adjustment settings for particular vehicle applications.

Amplifier 254 is coupled with amplifier 256 through a series capacitor 270 and resistor 272. A Zener diode 274 and capacitor 276 are connected to amplifier 256 through resistor 278. A biasing circuit comprising a diode 280 and capacitor 282 are also linked to the same input of amplifier 256. A feedback loop comprising resistor 284 is wired with the amplifier.

A diode 286 and timing capacitor 288 are coupled with the lead from the amplifier to npn-type transistor 290 base. A variable resistor 292 is coupled with transistor 290 emitter connection and the base of npn-type transistor 296. Transistor 296 collector connection is powered through LED indicator 294 and transistor 290 collector connection. The emitter of transistor 296 is coupled with a base of npn-type transistor 298 through a series resistor 300. Another resistor 302 connects the emitter with the chassis ground. The collector connection of transistor 298 is coupled with circuit 184 through a series resistor 304. Transistors 290, 296 and 298 are available under Motorola part number 2N3904. Circuits 250 and 184 are coupled with the 9.1 volt power supply and 12 volt circuit power supply through resistor 306. The Zener capacitor 274 provides on-board regulation to hold constant voltage.

In operation, circuit 184 controls application and release of the vehicle brakes through regulation of solenoid vacuum valve 114. When the door switch 112 closes upon opening of the vehicle door, transistor 198 turns on from the collector to emitter and charges timing capacitor 214 to 9.1 volts which is maintained by Zener diode 212. The charged capacitor 214 turns on transistor 206 emitter to 8.5 volts which turns on transistor 218. The collector of transistor 218 goes low causing transistor 228 to turn on. The emitter of transistor 228 in turn goes low and causes transistor 234 to turn on and pass high current from its emitter to the collector. This current flow then causes activation of brake solenoid vacuum valve 114 and the resulting application of the vehicle brakes. Illumination of LED indicator 240 alerts the driver to the application of the vehicle brakes.

After the vehicle door is closed, switch 112 opens but brake application is maintained for a predetermined period of time as transistor 206 is held on by timing capacitor 214. The RC timing circuit allows adjustment of the delay in switching off transistor 206 and hence release of the vehicle brakes. This feature is particularly desirable as it allows the delay in release of the brakes to be adjusted for particular applications. Vehicle passengers are thus provided with an adequate period of time to move away from the vehicle after disembarking.

As shown in FIG. 2, the sensor 252 and circuitry 250 operate to prevent activation of the solenoid vacuum valve 238 while the vehicle is traveling in excess of a predetermined speed. This prevents injuries which might result if the door were opened and the brakes were suddenly applied while the vehicle is traveling at a high rate of speed. The sensor operates by picking up vibrations from the drive shaft of the vehicle rather than sound waves. The signal is amplified to detector capacitors 262 and 286 by amplifiers 254 and 256. Capacitor 288 performs a sample and hold function similar to transistor 206. The emitter of transistor 290 turns on transistor 296 which turns on transistor 298. The transistor 298 then operates to pull timing capacitor 214 low which prevents application of the solenoid vacuum valve 238. LED indicator 294 also alerts the driver that the vehicle is traveling at a speed in excess of that which permits activation of solenoid valve 238.

By preventing automatic application of the brakes while the vehicle is traveling above a predetermined speed, the potentially undesirable consequences of a sudden stop are avoided. The predetermined speed at which the circuitry 250 overrides application of the solenoid valve 114 may be adjusted by varying circuit resistor 268. This adjustment allows the apparatus to be adapted for various applications. While sensor 252 is desirable because of its reliable operation, other vehicle speed monitoring mechanisms may also be utilized for this purpose. For instance, a mechanical governor device coupled with the speedometer cable has been found to provide reliable operation.

Turning now to FIGS. 3-5, the system components which regulate operation of the brake system will be described. Mechanical linkage 116 is normally in the position shown in FIG. 3 when the brakes are in an unapplied condition. When the brake pedal 170 is depressed as shown in FIG. 4, the linkage arm 148 causes axial movement of master cylinder plunger arm 150 which results in application of the vehicle brakes. Linkage arm 144 also pivots in the direction of movement of the plunger rod 150 due to the movement of guide pin 156 along the camming surface of arcuate slot 154. The position and configuration of slot 154 allows pivoting movement of linkage arm 144 while maintaining axial alignment of vacuum pod plunger arm 136.

When the vehicle door is opened, the door switch 112 closes and causes activation of the solenoid vacuum valve 114. This creates a vacuum in line 128 leading to pot 130 and causes axial retraction of plunger rod 136 to the position shown in FIG. 5. The retainer element 138 at the end of the rod engages retaining pin 152 and causes movement of linkage arm 144 in the general direction of retraction of the rod. Due to the coupling of linkage arm 144 and plunger rod 150 through the slot 154 and guide pin 156 arrangement, the plunger rod 150 is also moved in the same direction. This movement of the plunger rod then results in application of the vehicle brakes. Application of the vehicle brakes may thus be accomplished independently of brake pedal application. Even if the driver should fail to apply the brakes while traveling at a slow speed, the apparatus 110 will automatically cause application of the brakes when the door is opened and will significantly reduce the likelihood of injury to vehicle passengers as they board or disembark.

Upon release of the vehicle brake pedal 170 the biasing force acting on linkage arm 148 causes retaining pin 164 to travel along the slot 162 in the retainer element 160 and allows the linkage arm to return to its normal operating position as show in FIG. 5. The vehicle brakes, however, remain in an applied condition while the pod plunger rod 136 is in the retracted position. Without this important feature, the driver of the vehicle might attempt to circumvent the safety system of the invention and prematurely release the brakes by placing a foot behind the brake pedal linkage arm and urging it to its released position. Wwith the linkage of the present invention, the brake pedal is ineffective to cause release of the brakes and the vehicle remains immobilized while the vehicle door is open and for a predetermined period of time after the door is closed.

The present invention thus provides an advantageous method for preventing vehicle movement under predetermined and adjustable conditions. This results in a significant reduced likelihood of injury to vehicle passengers while boarding or disembarking from the vehicle.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:
1. Apparatus for preventing the release of a vehicle's brakes while a vehicle door is open and for preventing release of the brakes for a predetermined period of time after the door is closed, said apparatus comprising;

valve means coupled with the brakes and moveable between a first position preventing release of the brakes and a second position allowing release of the brakes;

positioning means coupled with the valve means for moving the valve means between the first position when the door is open and the second position when the door is closed; and a timer coupled with the positioning means for delaying movement of the valve means to the second position until the predetermined period of time has elapsed after the door is closed, wherein the vehicle brakes are maintained in an applied condition for the predetermined period of time after the door is closed.

2. The apparatus of claim 1, wherein the positioning means includes a switch coupled with the door for detecting the opening and closing of the door.

3. The apparatus of claim 1, wherein the positioning means and valve means comprise a solenoid valve coupled with a vehicle brake line containing a fluid, wherein the solenoid valve includes a plunger moveable between a first position for blocking fluid flow in the brake line and a second allowing fluid flow in the brake line.

4. The apparatus of claim 3, including bypass means to allow application of the vehicle brakes while the plunger is in the first position blocking fluid flow in the brake line.

5. The apparatus of claim 4, wherein the bypass means comprises a valve for allowing the one-way flow of fluid in the brake line while the plunger is in the first position, whereby the vehicle brakes may be applied but are prevented from releasing while the plunger is in the first position.

6. Apparatus coupled with a brake line of a vehicle for preventing release of the vehicle brakes after application while a vehicle door is open and for a predetermined period of time after the door is closed, said apparatus comprising:

a valve coupled with the brake line and moveable between a first position preventing fluid flow through the brake line and a second position allowing fluid flow through the brake line;

a switch coupled with the door for detecting when the door is in an open and a closed position;

valve positioning means coupled with the valve and switch for moving the valve between the first position when the door is open and the second position when the door is closed; and a timer coupled with the valve positioning means for delaying movement of the valve to the second position until the predetermined period of time has elapsed after the door is closed, wherein release of the vehicle brakes is delayed for the predetermined period of time after the door is closed.

7. The apparatus of claim 6, wherein the valve positioning means and valve comprising a solenoid valve coupled with the brake line and having a moveable plunger for blocking fluid flow through the brake line.

8. The apparatus of claim 6, including a bypass valve coupled with the brake line for allowing one-way fluid flow through the brake line, whereby the vehicle brakes may be applied while the valve is in the first position.

9. Apparatus for causing application of a vehicle's brakes while a vehicle door is open and for preventing release of the brakes for a predetermined period of time after the door is closed, said apparatus comprising;

valve means coupled with the brakes and moveable between a first position causing application of the brakes and a second position allowing release of the brakes;

means coupled with the vehicle for detecting opening and closing of the door, said detecting means operable coupled with the valve means for movement thereof between said first and second positions; and timing means coupled with the valve means for delaying movement of the valve means to the second position until the predetermined period of time has elapsed after the door is closed, wherein the vehicle brakes are maintained in an applied condition for the predetermined period of time after the door is closed.

10. The apparatus of claim 9, wherein the detecting means comprises a switch coupled with the door.

11. The invention of claim 9, including a mechanical linkage coupling said valve means with said vehicle brakes for controlling application thereof when said valve means is moved between said first and second positions.

12. The apparatus of claim 11, wherein the valve means comprises a solenoid vacuum valve operably coupled with said mechanical linkage.

13. The apparatus of claim 12 wherein said mechanical linkage includes a vacuum pod coupled with said solenoid vacuum valve, said vacuum pod including an extendable member moveable in response to positioning of said solenoid vacuum valve.

14. The apparatus of claim 12, wherein said mechanical linkage includes a vehicle brake pedal linkage arm moveable between applied and released positions and wherein said mechanical linkage includes means for allowing positioning of said linkage arm in said released position when said solenoid vacuum valve causes application of said vehicle brakes.

15. The apparatus of claim 9, including a sensor operable for determining when said vehicle is traveling above a predetermined speed, said sensor coupled with said valve means for preventing movement of the valve means to said first position when said vehicle is traveling above said predetermined speed.

* * * * *